Oct. 7, 1969  T. N. SHOCKEY  3,470,907
ONE-PIECE PLASTIC GAS TANK AND FUEL LEVEL SENSING
APPARATUS AND METHOD
Filed May 9, 1966  2 Sheets-Sheet 2
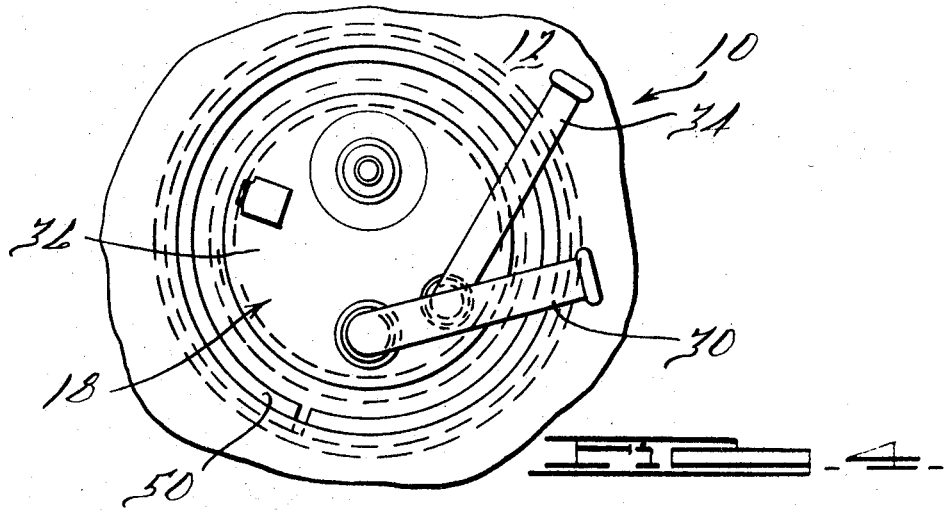
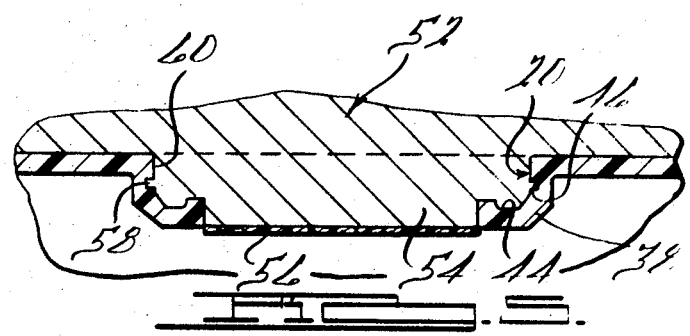
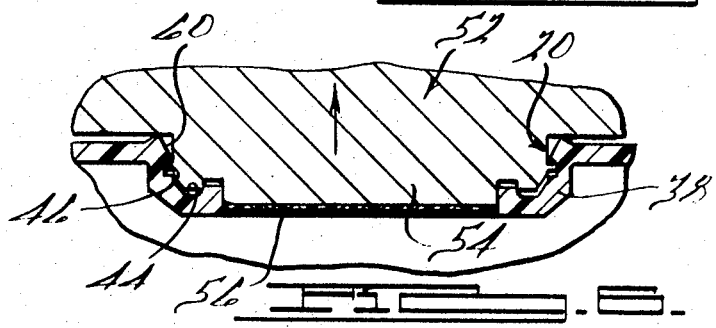
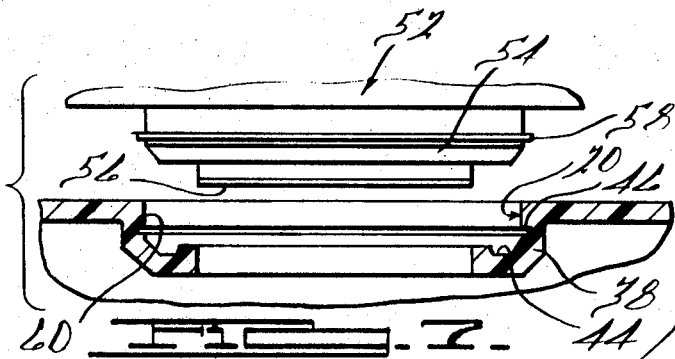
INVENTOR.
Thomas N. Shockey
BY
Harness, Dickey & Pierce
ATTORNEYS

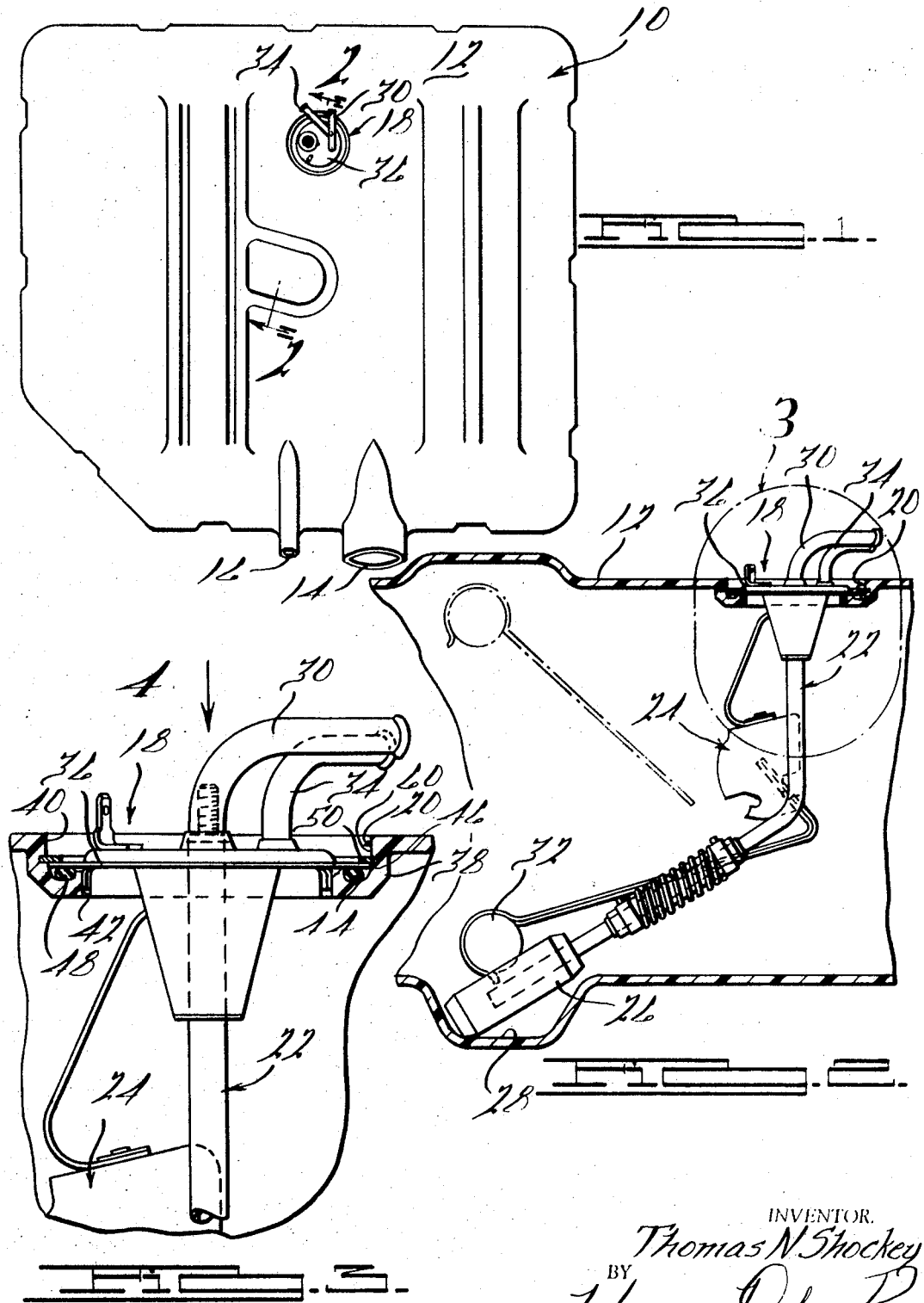

United States Patent Office 3,470,907
Patented Oct. 7, 1969

3,470,907
ONE-PIECE PLASTIC GAS TANK AND FUEL LEVEL SENSING APPARATUS AND METHOD
Thomas N. Shockey, Bedford Township, Monroe County, Mich., assignor to Kaiser Jeep Corporation, Toledo, Ohio, a corporation of Nevada
Filed May 9, 1966, Ser. No. 548,783
Int. Cl. B65d 51/26, 55/00
U.S. Cl. 137—590                                                 5 Claims

ABSTRACT OF THE DISCLOSURE

A plastic gas tank for automotive vehicles or the like including an aperture for receiving a fuel level sensing and outlet unit which aperture is cast free of any metallic insert and the method of making the tank and of forming the assembly.

---

The present invention relates to plastic fuel tanks and more specifically to the method of making plastic fuel tanks.

It is desirable to be able to construct a fuel tank out of a moldable plastic material since various shapes can be made to fit an irregularly shaped space in the underbody of a vehicle and hence to effectively utilize the available space located there.

One problem of plastic gas tank assemblies however, has been in the formation of a suitable construction for the gas outlet and level sensing unit. In the past, metallic rings have been cast in the plastic tank to facilitate the assembly of the sensing and fuel outlet unit thereto. However, one disadvantage of such a construction is that the plastic has a different shrink characteristic than the metal and when set high residual stresses remain in the plastic around the metal ring; these stresses can result in premature failure.

In the present invention a construction is provided in which the need to cast metallic rings with the plastic tanks is eliminated and hence the above residual stresses are eliminated. Therefore, it is an object of the present invention to provide a plastic gas tank in which the aperture for the sensing and outlet unit can be cast with minimal residual stresses.

It is another object of the present invention to provide a plastic gas tank construction in which the aperture for receiving the sensing and outlet unit is cast free of any metallic insert.

It is still another object of the present invention to provide a novel and improved plastic fuel tank construction.

The above construction is facilitated by the method of casting the gas tank shell and assembling the components therein. Therefore, it is an object of the present invention to provide a novel means for casting a plastic fuel tank shell.

It is another object of the present invention to provide novel means for making a plastic gas tank shell and assembling a sensing and outlet unit thereto.

In the drawings:
FIGURE 1 is a top elevational view of a plastic gas tank including a sensing and outlet unit and exemplifying the features of the present invention;
FIGURE 2 is a fragmentary sectional view to an enlarged scale of the plastic gas tank assembly of FIGURE 1, taken substantially along the line 2—2 of FIGURE 1;
FIGURE 3 is an enlarged fragmentary view of the apparatus of FIGURE 2 generally shown in the area of dash-dot line shown in FIGURE 2 and indicated by the numeral 3;
FIGURE 4 is a view of the apparatus of FIGURE 3 taken generally in the direction of the arrow designated by the numeral 4;

FIGURE 5 is a sectional view generally of that part of the gas tank shell shown in FIGURE 3 and shown in conjunction with the apparatus for molding the gas tank shell and showing one step in the process of making the gas tank shell;
FIGURE 6 is a sectional view similar to that of FIGURE 5 depicting a different step in the process of making the gas tank shell; and
FIGURE 7 is a view similar to that shown in FIGURES 5 and 6 depicting the final step in the operation of making the gas tank shell.

Looking now to FIGURE 1, a gas tank assembly is generally indicated by the numeral 10 and includes a plastic gas tank shell member 12, which has a fuel intake tube portion 14 located at one end along with a vent tube 16 which serves purposes well known in the art. Assembled to the shell 12 is a fuel level sensing and outlet unit 18.

Looking now to FIGURES 2 through 4, the sensing and outlet unit 18 is shown to be mounted in an aperture 20 in the upper part of the fuel shell 12. The unit 18 is generally of a conventional construction and includes a fuel outlet assembly 22 and a fuel level indicating assembly 24. The outlet assembly 22 includes a filter member 26 which is adapted to be located within a cavity 28 at the bottom of the fuel tank shell 12 and is provided with a fluid passage 30 which communicates with the filter 26 whereby fuel can be drawn out from the interior of the fuel tank assembly by means of the fuel pump (not shown). The level indicating assembly 24 is provided with a float member 32, which is shown in an alternate position in phantom, and which can provide a signal to the fuel gauge (not shown) indicating the fuel level in the tank. The sensing unit 18 is provided with a generally flat, round cover plate member 36 which is held within the aperture or cavity 20 by means to be presently described. The aperture 20 has a generally enlarged diameter counterbore portion 40 at its outer end, and a reduced diameter bore portion 42 at its inner end. In addition, an interiorly extending, annular lip 38 is provided with an annular groove 44 which faces axially outwardly from the cavity 20 with a radially inwardly facing annular groove 46 being located axially outwardly from the groove 44 and extending into the side wall of the annular lip portion 38.

The enlarged diameter counterbore portion 40 is of a diameter to receive the circular cover member 36; an O-ring seal 48 is located in the annular sealing groove 44 and is of a diametrical thickness to extend slightly outwardly beyond the confines of the groove 44 and hence to engage the lower surface of the cover member 36. A snap ring 50 is located within the groove 46 and engages the upper surface of the circular cover member 36 to force the member 36 downwardly into compressive engagement with the O-ring 48 to provide therebetween a fluid tight seal. The locking ring 50 can be of a split ring type or can be of the helical type. With the construction as shown, the fuel tank shell member 12 can be cast with the aperture 20 as described free from any cast-in metallic inserts. Thus, no residual stresses will exist in the cavity 20 as the result of shrinkage on a metal ring. However, with the construction shown, the sensing and outlet unit 18 can readily be assembled into the cavity 20 to provide a fluid tight seal with the cavity 20.

Looking now to FIGURE 5, a portion of the casting apparatus for molding the shell 12 is shown and is generally designated by the numeral 52. The casting apparatus provides for the formation of the shell 12 by rotational casting. In rotational casting the part is formed by rotating the die with the plasic flowing to the inner surface of the die to form a part defined by the contour of this inner surface. The die portion 52 is provided with a protruding portion 54 which is of a shape to form the radially inner contour of the cavity 20. The bottom surface of the protrusion 54 is covered with a film of material 56 such that the plastic material of the shell 12 will not adhere thereto during the casting operation and hence an opening will remain when the protrusion 54 is removed. A thermoplastic is utilized for a purpose to be presently understood. The protruding portion 54 defines the annular locking ring receiving groove 46 as well as the sealing ring receiving groove 44, and of course the lip portion 38 as well as the other portions of the cavity 20. The groove 46 is defined by an annular ring portion 58. In the molding operation the thermo-plastic is initially in a fluid state and during the rotational processes will define the shape of the shell 12, with the plastic material not adhering to the coating 56 at the bottom of protrusion 54. When the shell 12 has been defined and while the plastic material is still in an unhardened state, the die assembly 52 is removed with the insert 56 being pulled outwardly from the cavity 20. Note that the ring portion 58 which defines the locking ring groove 46 in the cavity 20 is in interference with the outer portion 60 of the cavity 20. However, with the material of shell 12 still unhardened, the die can be removed with the protrusion portion 54 moving outwardly with the ring 58 deforming the upper portion 60 of the groove 20 as shown in FIGURE 6. Because of the memory characteristics of the thermoplastic and since the plastic is not yet in a hardened state, the upper portion 60 of the groove 20 will return to its original shape as shown in FIGURE 7, and with the retaining ring groove 46 being defined thereby. Note that the upper portion 60 is of a preselected thickness to perimt the removal of the ring 58 as the protrusion portion 54 is moved axially.

Note that with the method of forming the opening 20 is shown, a simple one-piece die can be utilized and also it is not necessary to cast in metallic inserts. The assembly is completed by next inserting the O-ring seal 48 into the groove 44, locating the sensing and outlet unit 18 into the enlarged diameter bore portion 40 of the cavity 20 and then inserting the locking ring 50 into the locking ring groove 46 to thereby lock the sensing and outlet unit 18 within the cavity 20 and in compressive engagement against the seal 48 to provide a fluid tight seal thereby.

What is claimed is:

1. A liquid fuel tank assembly for an automotive engine or the like comprising a one-piece fuel tank of a thermoplastic material and sensing means mounted to said tank for sensing the level of fuel therein, said sensing means including a mounting plate, said fuel tank having a formed cavity for receiving said plate after formation of said cavity with the material defining said cavity being of the same thermo-plastic material as that portion of the tank immediately adjacent thereto, and lock and seal means for locking and sealing said plate in said cavity, said lock and seal means including a locking ring and with said cavity having an annular, radially inwardly facing lock groove for receiving said locking ring, said lock and seal means further including a sealing ring located within said cavity.

2. The fuel tank assembly of claim 1 with said cavity having an enlarged bore at its outer end with said enlarged bore being of a size to receive said plate, said cavity having an axially outwardly facing shoulder at the termination of said enlarged bore, an annular sealing groove in said surface for receiving said sealing ring with said sealing ring extending axially outwardly from said sealing groove, said locking ring in said lock groove and engaging the outer surface of said plate for holding said plate in compressive engagement with said sealing ring.

3. In a liquid fuel tank assembly for an automotive engine or the like comprising a plastic fuel tank and sensing means mounted to said tank for sensing the level of fuel therein, said sensing means including a mounting plate, said sensing means including a mounting plate, said fuel tank having a cavity for receiving said plate with the material defining said cavity being of the same material as that portion of the tank immediately adjacent thereto, said fuel tank assembly further comprising lock and seal means including a locking ring and with said cavity having an annular, radially inwardly facing lock groove for receiving said locking ring and with said protruding portion having a radially outwardly extending annular ring portion for defining said lock groove, said lock and seal means including a sealing ring and with said cavity having an annular sealing groove for receiving said sealing ring, said cavity having an enlarged bore at its outer end with said enlarged bore being of a size to receive said plate, said cavity having an axially outwardly facing shoulder at the termination of said enlarged bore with said sealing groove located in said shuolder, said sealing ring being resilient and extending axially outwardly from said sealing groove, said lock groove being formed in the surface of said enlarged bore by said annular ring portion, said tank constructed by the method comprising: the steps of casting said tank from a thermo-plastic material with said cavity cast about a protruding portion having a contour to define said cavity and removing said protruding portion before the plastic of said tank has solidified, said removal step providing deforming the material immediately above said lock groove as said protruding portion is removed with said deformed material returning to its original shape as the plastic solidifies, locating said sealing ring in said sealing groove after said protruding portion has been removed, locating said plate of said sensing means in said cavity and onto said sealing ring, and locating said locking ring in said lock groove and in engagement with said plate to lock said sensing means to said tank with said plate in compressive engagement with said sealing ring with said sealing ring providing a fluid tight seal between said plate and said sealing groove.

4. The method of claim 2 with said sensing means including fuel outlet means connected to said plate for providing an outlet for fuel in said tank.

5. The method of claim 3 with said material immediately above said lock groove being of a preselected thickness permitting removal of said ring portion of said protruding portion by axial movement of said ring portion without damage to said cavity.

References Cited

UNITED STATES PATENTS

| 1,916,692 | 7/1933 | Scribner | 264—318 |
| 2,080,948 | 5/1937 | Mazoyer et al. | 264—318 XR |
| 2,336,423 | 12/1943 | Rieser | 264—318 |
| 2,679,333 | 5/1954 | Starck | 137—578 |
| 124,710 | 3/1872 | Wilcox | 220—46 X |
| 2,743,034 | 4/1956 | Wheatley | 220—46 X |
| 2,811,337 | 10/1957 | Andersen | 220—46 X |
| 3,173,469 | 3/1965 | Shockey | 158—46 |
| 3,280,600 | 10/1966 | Meyers | 67—7.1 |

HENRY T. KLINKSIEK, Primary Examiner

U.S. Cl. X.R.

29—529; 220—86; 264—318; 285—205, 321

PO-1050
(5/69)

UNITED STATES PATENT OFFICE
CERTIFICATE OF CORRECTION

Patent No. 3,470,907        Dated October 7, 1969

Inventor(s) Thomas N. Shockey

It is certified that error appears in the above-identified patent and that said Letters Patent are hereby corrected as shown below:

Column 2, line 66, delete "designed" and substitute therefor --designated--
Column 3, line 12, delete "processes" and substitute therefor --process--
Claim 3, line 5, delete "said sensing means including a mounting plate"
Claim 3, line 21, delete "shuolder" and substitute therefor --shoulder--

JAN 20 1970

(SEAL)
Attest:

Edward M. Fletcher, Jr.
Attesting Officer

WILLIAM E. SCHUYLER, JR.
Commissioner of Patents